Sept. 14, 1948.   J. P. HOUCK   2,449,480
LIGHTING CONTROL SYSTEM FOR AIRPORTS
Filed July 20, 1944
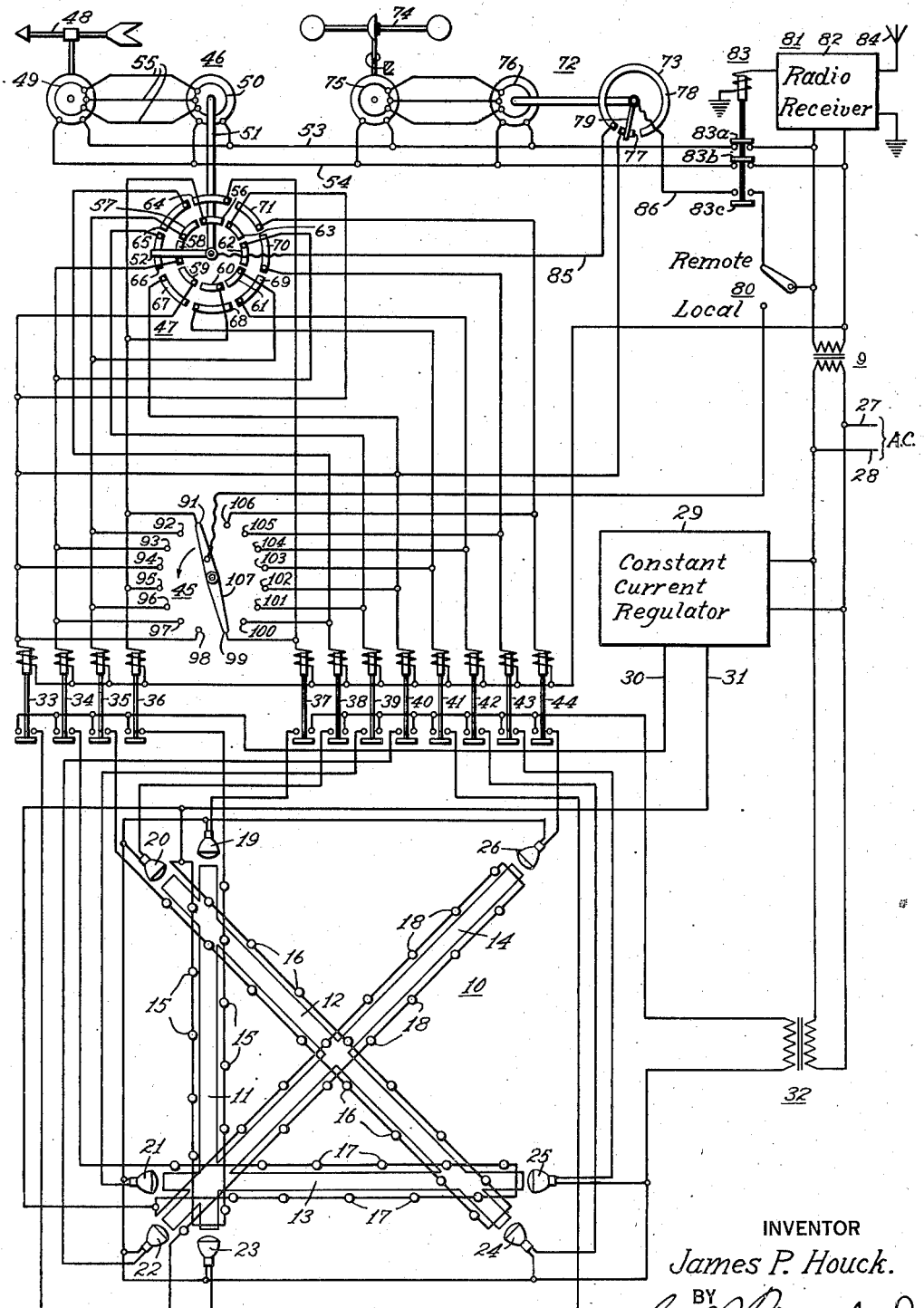
INVENTOR
James P. Houck.
BY
G. M. Crawford
ATTORNEY Patented Sept. 14, 1948

2,449,480

UNITED STATES PATENT OFFICE 2,449,480

LIGHTING CONTROL SYSTEM FOR AIRPORTS

James P. Houck, Wilkinsburg, Pa., assignor to Westinghouse Electric Corporation, East Pittsburgh, Pa., a corporation of Pennsylvania Application July 20, 1944, Serial No. 545,821

7 Claims. (Cl. 177—352)

My invention relates, generally, to control systems and, more particularly, to a remote control system for controlling the contact or marker lights and floodlights of an airport.

At the present time, runway marker or contact lights as well as floodlights are being used on attended airports to great advantage in assisting planes in landing and taking off at night. The use of contact and floodlights at unattended airports, however, has not to my knowledge been attempted for the reason that suitable control equipment has not been available for controlling these lights at the will of the pilot of a plane in landing or taking off from the field. Such control equipment must be positive and flexible in operation and also permit of alternate local control of the lights, if desired. It must also be such that it may be controlled from a plane approaching the field for landing to effect the lighting of the proper runway if there are more than one in accordance with wind direction and velocity.

Accordingly, the object of my invention, generally stated, is to provide for controlling the contact and/or floodlights of an airport or landing field from an airplane in flight as well as when it is upon the field.

A more specific object of my invention is to provide for controlling the contact and/or floodlights of an airport by the use of a control signal or signals transmitted from an airplane.

Another object of my invention is to provide a remote control system for airport lighting which may be utilized to control the contact and/or floodlights manually or in response to wind direction and wind velocity or in response to a control signal transmitted from an airplane.

A further object of my invention is to provide a control system for airport lighting which shall function in response to a signal transmitted from an airplane to selectively energize the contact and/or floodlights of a plurality of runways extending in different directions dependent upon wind direction and/or wind velocity.

Another object of my invention is to provide a control system for airport lighting which shall be responsive to a control signal or signals transmitted from an airplane to energize the contact lights and/or floodlights of the longest runway in the event that the wind velocity does not exceed a predetermined value and to selectively energize the contact and/or floodlights of one of a plurality of runways as determined by wind direction in the event that the wind velocity exceeds the predetermined value.

Another object of my invention is to provide a control system for airport lighting wherein the system is rendered unresponsive to wind direction and/or wind velocity when it operates in response to a control signal and to remain in such condition until the control signal has been terminated.

These and other important objects of my invention will become more apparent from the following detailed description of a preferred embodiment thereof when read in conjunction with the drawing, in which the single figure illustrates diagrammatically an airport lighting control system embodying the principal features of my invention.

Referring to the drawing, there is shown one embodiment of my invention for controlling the contact and floodlights of an airport 10 having a plurality of runways 11, 12, 13, and 14 located at 45° angles and each having a plurality of contact lights 15, 16, 17, and 18, respectively, and also a plurality of floodlights 19, 20, 21, 22, 23, 24, 25, and 26, one of which is positioned at each end of each runway.

The contact lights associated with each of the four runways are connected in series circuit relation in the usual manner and are disposed to be energized from an alternating-current source represented by conductors 27 and 28 through a suitable constant current device or transformer 29. The various groups of contact lights are connected to the constant current device 29 through conductors 30 and 31 by means of a plurality of contactors 33, 34, 35, and 36, one of which is individual to each group of series connected contact lights.

In view of the fact that the runway to be used is lighted for one wind direction as well as for the opposite wind direction, only one contactor per runway is required. The floodlights are likewise energized from the alternating-current source through a suitable transformer 32, and their connection thereto is controlled by contactors 37, 38, 39, 40, 41, 42, 43, and 44, one of which is individual to each floodlight.

In view of the fact that only one floodlight at either end of the runway is used when landing or taking off, depending upon the wind direction, each floodlight is provided with a separate contactor.

In this embodiment of my invention, provision is made for selectively controlling the contact and floodlights either manually or automatically in response to a control signal, which may be in the form of a radio signal.

For the purpose of manual control, a local control selector switch 45 is provided. This switch functions when actuated in the direction indicated by the arrow to control the energization of the proper one of the group of contactors 33 through 36 for the contact lights and the proper one of the group of contactors 37 through 44 for the floodlights.

In order to provide for selecting the proper group of contact lights and the proper floodlight for operation in accordance with wind direction, a wind direction selector, indicated generally at 46, is provided. This device comprises a selector switch 47 which is controlled in accordance with the position of a wind direction indicator 48 through the operation of a synchro-tie connection comprising a transmitter 49 and a receiver 50. The rotor of a transmitter is actuated either directly or through suitable gearing, not shown, by the wind direction device, and the rotor of the receiver 50 is connected through a suitable shaft 51 to the moveable contact member 52 of the selector switch 47. The stator windings of the transmitter and receiver are energized from the source of current through a suitable transformer 9 and conductors 53 and 54, and the three-phase rotor windings are connected together in a well known manner by conductors 55.

The selector switch 47 is provided with a plurality of contact segments 56, 57, 58, 59, 60, 61, 62, and 63 which are connected to the operating coils of the contactors 33, 34, 35, and 36 for controlling the contact lights. It will be apparent that opposite segments of the group are connected in parallel to the operating coil of each of the contactors. This is for the purpose of actuating the same contactor to effect the energization of the contact lights of the same runway when the wind is in one direction or in exactly the opposite direction. Thus, when the movable contact member 52 of the selector switch 47 is in the position shown, the contactor 34 is selected for operation. Since the opposite segment 62 is connected in parallel with the segment 58, the contactor 34 will likewise be selected for operation when the movable contact member 52 is in its opposite position from that shown. The same is true with respect to all of the other contact segments of the group 56 through 63.

The selector switch 47 is also provide with another group of contact segments 64, 65, 66, 67, 68, 69, 70, and 71 for the purpose of selecting the contactors 37 through 44 for controlling the energization of the floodlights. In this instance, each of these contactors is connected to an individual contact segment of the selector switch for the reason that a particular floodlight must be energized depending upon the wind direction.

The two groups of contact segments of the selector switch 47 are so positioned that the proper contact lights and floodlight are selected for operation in response to the position of the wind indicating device 48.

In order to provide for controlling the selection of the proper group of contact lights and a floodlight in accordance with wind velocity, a wind velocity device, shown generally at 72, is utilized. This device comprises a selector switch 73 which is actuated in accordance with wind velocity by a suitable anemometer 74 which is connected to the selector switch through a synchro-tie comprising a transmitter 75 and a receiver 76. Since this synchro-tie is similar to the one previously described, it will not be described in detail.

The selector switch 73 is provided with two stationary contact segments 77 and 78 and a cooperative movable contact member 79 which is actuated by the receiver 76. The contact segment 77 is engaged by the movable contact member 79 when the wind velocity is below a predetermined value and is utilized for the purpose of selecting the contact lights and floodlight on the longest of the four runways. In this instance, the runway 14 is considered to be the longest, and the contact segment 77 is connected to the energizing circuits of the contactors 33 and 40.

It will be apparent that when the selector switch 73 is in the position shown, the contactors 33 and 40 are selected for subsequent energization regardless of the position of the selector switch 47.

In order to provide for controlling the operation of the contact and floodlights in response to a control signal such as a radio signal, for example, which may be transmitted from a plane either in flight or when upon the ground, a signal responsive device, indicated generally at 81, may be utilized. This device comprises a suitable radio receiver 82 which may be tuned to a particular frequency and a control relay 83, the operation of which is controlled by the receiver. The receiver 82 is connected to ground and to a suitable aerial 84 in the usual manner. It is to be understood that when the radio receiver 82 responds to a particular radio signal, the control relay 83 is energized and actuated to open its contact members 83a and 83b and close its contact member 83c.

The normally closed contact members 83a and 83b control the energizing circuit for the synchroties in such manner that when the radio receiver functions, this circuit is interrupted to render the wind direction and wind velocity devices ineffective to change the selection of the runway which has already been made.

The contact members 83c of the control relay are connected in the energizing circuits of the contactors 33 through 44. Thus, when contact members 83c close in response to a radio signal, the contactors for controlling the contact lights and the floodlight of a particular runway are energized from the source of current represented by conductors 27 and 28.

A selector switch 80 is provided for conditioning the system for either local control by means of the manually operated selector 45 or remote control by means of the devices 46, 72, and 81.

In the operation of the system, it may be assumed that the wind direction is as indicated by the device 48, and that the wind velocity is zero or below a predetermined minimum value. With the movable contact element 52 of the selector switch 47 in the position shown, the contactor 34 is selected for operation by having its energizing circuit partially completed through the movable contact element 52 and the contact segment 58.

At the same time, the movable contact member 52 engages the contact segment 66 which selects contactor 39 for subsequent operation by partially completing its energizing circuit.

The contactor 34 which has been selected functions when operated to energize the contact lights 17 associated with the runway 13. The contactor 39 which has also been selected functions when operated to energize the floodlight 21 located at the left or west end of the runway 13, as viewed in the drawing.

The complete energizing circuit for these selected contactors extends from the movable contact member 52 of the selector switch 47, through conductor 85 to contact segment 78 of the selector switch 73. It will be noted, however, that since the movable contact member 79 of this selector switch is now in engagement with the short contact segment 77, the circuit which would normally extend through the movable contact member 79, conductor 86, contact members 83c, and switch 80 to one side of the source of current is not completed. Accordingly, the wind direction selector 46 is ineffective due to the low wind velocity.

The circuit in this instance is controlled by the position of the selector switch 73, which in response to the closure of contact members 83c of the control relay effects the energization of contactors 33 and 40 which control the contact lights and one of the floodlights associated with the longest runway 14. In this instance, the contactor 40 effects the energization of the floodlight 22.

In response to the operation of the control relay 83, the contact members 83a and 83b are opened to deenergize the synchro-tie elements of the devices 48 and 74. This, as explained hereinbefore, eliminates the possibility of having these devices respond to a sudden increase in wind velocity to change the selected runway at any time. This condition exists so long as the control relay 83 is energized, and, therefore, the selected runway may be retained in a lighted condition so long as the radio signal is being transmitted regardless of whether the plane is still in flight or has landed or is preparing to take off.

It will be apparent that if the wind velocity is such as to cause the movable contact member 79 of the selector switch 73 to engage its stationary contact segment 78, the wind direction selector 46 will be rendered effective to select the proper runway in accordance with wind direction. Thus, assuming that this condition of wind velocity exists when the control relay 83 is energized and the wind direction selector 46 is in the position shown, contactors 34 and 39 will be selected and energized. The closure of contactor 34 energizes the contact lights 17 of runway 13, and the closure of contactor 39 energizes the floodlight 21 at the west end of this same runway. Therefore, so long as the selector switch 73 is in such position that its movable contact member 79 engages segment 78, the wind direction selector 46 will have complete control of the selection of a proper runway and its associated group of contact lights and a particular floodlight as determined by wind direction.

In the event that it is desired to control the contact and floodlights locally by means of the manual control switch 45, the selector switch 80 may be actuated to the local position opposite to the position shown. This interrupts the energizing circuit extending through the control relay 83 and the selector switches 73 and 47. The control of the contactors 33 through 44 is effected in the same manner through the functioning of the control switch 45 as its contact elements 91 through 98 are connected in parallel circuit relation to the contact elements 56 through 63 of the selector switch 47, these two groups of contact elements functioning to control the group of contactors 33 through 36.

The same is true with respect to the other group of contact elements 99 through 106 of the selector switch 45 which are connected in parallel circuit relation with the other group of contact elements 64 through 71 of the selector switch 47. When the movable contact member 107 of the selector switch 45 is actuated counterclockwise in the direction of the arrow, it energizes the proper one of the group of contactors 33 through 36 controlling the contact lights and the proper one of the group of contactors 37 through 44 controlling the floodlights. Since it is believed that the energizing circuits established by the operation of this switch are obvious, they will not be described in detail.

In view of the foregoing description of my invention, it will be apparent that I have provided for controlling the operation of the contact and/or floodlights of an airport in such manner that the airport may be used regardless of whether or not an attendant is present. The system is particularly suitable for use at remotely located airports which do not have operators present at all times or at any time. It is also suitable for use on air fields which are utilized for emergency landings, and in this respect, the radio signal control alone without the use of the local manual control may be utilized. The radio signal control feature of the system may also be applied to present systems which provide only for manual control.

It is apparent that certain changes and modifications may be made in the system as disclosed without departing from the principles of the invention.

I claim as my invention:

1. A control system for lighting circuits comprising, means including a first selector switch operable in response to wind direction for selecting one of said lighting circuits for operation in accordance with wind direction, means including a control relay responsive to a control signal operable to effect the energization of the selected lighting circuit, and second selector switch means responsive to wind velocity operable to render said relay effective to effect energization of only a predetermined one of said lighting circuits regardless of the selection made in accordance with wind direction in the event that the wind velocity is below a predetermined value, said control relay functioning when operated to render said first and second selector switch means ineffective to change the selection made.

2. A system for selectively controlling the operation of a plurality of lighting circuits connected for energization to a constant current supply circuit comprising, an electrically operated switch for controlling the energization of each lighting circuit, said switches having operating windings connected in parallel circuit relation across a common operating circuit, first switch means responsive to wind direction operable to preselect one of said switches for operation by closing its individual circuit, second switch means responsive to wind velocity operable when the wind velocity exceeds a predetermined value to render said preselected switch responsive to closure of the common operating circuit and operable when the wind velocity is below said predetermined value to render only a predetermined one of said switches responsive to closure of the common operating circuit independently of the selected switch, and switch means responsive to a control signal for closing said common operating circuit and for rendering said first and second switch means ineffective to change the selection made, during such time as the common operating circuit is being held closed by said switch means.

3. A system for selectively controlling the energization of the contact and/or floodlights of a plurality of runways of an airport comprising, electrically operated switch means for controlling the energization of the lights associated with each runway, means including a first electro-responsive position transmitting element responsive to wind direction for selecting one of said switch means for operation, means including a second electro-responsive position transmitting element responsive to wind velocity operable to render said means ineffective to make a selection in the event that the wind velocity does not exceed a predetermined value and to select only a predetermined switch means for operation, and relay means operable in response to a control signal for energizing any one of the selected switch means, said relay means being effective when so operated to render said first and second electro-responsive position transmitting means ineffective so long as said relay means remains in its operated condition.

4. A system for selectively controlling the operation of a plurality of groups of contact lights associated with a plurality of runways of an airport comprising, an electrically operated switch individual to each group of contact lights for controlling the energization thereof, means responsive to wind direction, first selector switch means, first electrical means actuated by said means responsive to wind direction for actuating the first selector switch means for selecting one of said electrically operated switches for operation, relay means responsive to a radio signal for energizing any selected switch means, means responsive to wind velocity, second selector switch means, and second electrical means actuated by said means responsive to wind velocity for actuating the second selector switch means to determine whether a selected switch means will be energized by the relay means or a predetermined one of said switch means only will be energized independently of the selection made, said relay means also functioning when operated in response to a radio signal to render the first and second electrical means ineffective.

5. A system for selectively controlling the operation of a plurality of groups of contact lights and/or a floodlight associated with a plurality of runways of an airport comprising, electrically operated switch means operable to connect an associated group of lights to a current source, an energizing circuit for said switch means including a common conductor disposed to be connected to a source of control current, a first selector switch operable to selectively preset one of the switch means for energization in response to the energization of said common conductor, means including electroresponsive position transmitting means responsive to wind direction for actuating said selector switch, a second selector switch means operable to selectively render the first selector switch ineffective to preset one of the switch means for energization and to preset a predetermined one of the switch means for energization, means including electroresponsive position transmitting means responsive to wind velocity for actuating said second selector switch, and relay means responsive to a radio signal for controlling the energization of a selected switch means, said relay means being further effective when in its operated position to render said electro-responsive position transmitting means associated with both selector switches ineffective.

6. A system for selectively controlling the operation of a plurality of groups of contact lights and/or a floodlight associated with a plurality of runways of an airport comprising, electrically operated switch means operable to connect an associated group of lights to a current source, an energizing circuit for said switch means including a common conductor disposed to be connected to a source of control current, a first selector switch operable to selectively preset one of the switch means for energization in response to the energization of said common conductor, means including electroresponsive position transmitting means responsive to wind direction for actuating said selector switch, a second selector switch means operable to selectively render the first selector switch ineffective to preset one of the switch means for energization and to preset a predetermined one of the switch means for energization, means including electroresponsive position transmitting means responsive to wind velocity for actuating said second selector switch, an energizing circuit for connecting the electroresponsive position transmitting means to a source of current, and relay means responsive to a radio signal for controlling the energization of a selected switch means, said relay means being effective when actuated to either connect the said common conductor or said predetermined one of the switch means to a current source and to interrupt the energizing circuit of the electroresponsive position transmitting means.

7. A system for controlling the energization of the contact lights of a plurality of runways of an airport comprising, electrically operated switch means for controlling the energization of the lights of each runway, first control means responsive to wind direction only operable to select for energization the switch means controlling the energization of the lights of a particular runway in accordance with wind direction, second control means responsive to wind velocity only operable in response to a wind velocity exceeding a predetermined value for rendering the selection of said first control means effective and operable in response to a wind velocity below said predetermined value to select only a predetermined one of said switch means for operation, said first and second control means including electrically operated elements, an energizing circuit therefor, and relay means responsive to a radio signal operable to effect energization of the selected switch means and to render the first and second control means ineffective to change the selection of a switch means during such time as the relay means is under the control of the radio signal by interrupting their associated energizing circuit.

JAMES P. HOUCK.

REFERENCES CITED

The following references are of record in the file of this patent:

UNITED STATES PATENTS

| Number | Name | Date |
|---|---|---|
| 1,638,417 | Sperry | Aug. 9, 1927 |
| 1,673,369 | Mills | June 12, 1928 |
| 1,776,111 | Donaldson | Sept. 16, 1930 |
| 2,052,333 | Williams | Aug. 25, 1936 |
| 2,325,258 | Mallory | July 27, 1943 |
| 2,407,949 | Corcanges | Sept. 17, 1946 |

FOREIGN PATENTS

| Number | Country | Date |
|---|---|---|
| 299,699 | Great Britain | Aug. 15, 1929 |